US006612676B1

(12) United States Patent
Minckler

(10) Patent No.: US 6,612,676 B1
(45) Date of Patent: Sep. 2, 2003

(54) APPARATUS AND METHOD FOR REAL-TIME MEASUREMENT OF DIGITAL PRINT QUALITY

(75) Inventor: Kevin M. Minckler, East Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/193,608

(22) Filed: Nov. 17, 1998

(51) Int. Cl.$^7$ .............................................. G01D 15/18

(52) U.S. Cl. ........................... 347/19; 399/49; 358/406

(58) Field of Search ......................... 347/2, 19; 399/49, 399/41, 39; 358/406, 504

(56) References Cited

U.S. PATENT DOCUMENTS 3,763,356 A 10/1973 Berler
4,241,406 A 12/1980 Kennedy et al. ............ 364/518
4,648,048 A 3/1987 Dorn et al. ................. 364/526
4,878,082 A * 10/1989 Matsushita et al. ........... 399/49
4,900,941 A 2/1990 Barton et al. ............... 250/566
4,907,013 A 3/1990 Hubbard et al.
5,038,208 A 8/1991 Ichikawa et al. ......... 358/75 IJ
5,070,410 A * 12/1991 Hadley .......................... 347/3
5,128,691 A 7/1992 Millet et al.
5,206,668 A 4/1993 Lo et al.
5,224,421 A 7/1993 Doherty ...................... 101/211
5,289,208 A 2/1994 Haselby .................. 346/140 R
5,315,316 A 5/1994 Khormaee
5,321,436 A * 6/1994 Herbert ....................... 347/19
5,378,563 A * 1/1995 Ito ............................. 430/30
5,430,306 A 7/1995 Ix
5,473,351 A 12/1995 Helterline et al. ............ 347/19
5,495,103 A 2/1996 Utiger et al. ............ 250/222.1
5,559,339 A 9/1996 Domanik et al.
5,587,728 A 12/1996 Edgar .......................... 347/19
5,596,353 A 1/1997 Takada et al. ................ 347/19
5,650,804 A 7/1997 Kawamura et al. ........... 347/19
5,671,059 A * 9/1997 Vincent ...................... 250/226
5,736,996 A 4/1998 Takada et al.
5,760,799 A 6/1998 Inui et al. ...................... 347/14
5,764,251 A 6/1998 Hashimoto et al. ........... 347/16
5,771,051 A 6/1998 Guenther et al. ............. 347/19
5,781,204 A 7/1998 Kanematsu et al. .......... 347/17
5,798,772 A 8/1998 Tachihara et al. ............. 347/11
5,806,994 A 9/1998 Coffy et al. .................. 347/23
5,956,051 A 9/1999 Davies et al. ................. 347/19
6,137,570 A 10/2000 Chuang et al.
6,196,651 B1 3/2001 Zuber et al.

FOREIGN PATENT DOCUMENTS

EP 0702334 A1 8/1995 ........... G07B/17/02
EP 0702335 A1 8/1995 ........... G07B/17/02
EP 0714777 B1 11/1995 ............ B41J/2/165

* cited by examiner

*Primary Examiner*—Judy Nguyen
*Assistant Examiner*—Julian D. Huffman
(74) *Attorney, Agent, or Firm*—Angelo N. Chaclas; George M. Macdonald; Charles R. Malandra

(57) ABSTRACT

Apparatus and method for monitoring print quality produced by a digital printing mechanism in real-time. Print quality is measured by: generating a background reflectance signal representative of the reflectance of a substrate; scanning the image to generate a post-print reflectance signal; comparing the reflectance signal with the post-print reflectance signal; and, if the post-print reflectance signal is greater than a predetermined fraction of said reflectance signal, generating an output signal indicative of poor quality. In one embodiment of the invention, the output signal is also generated if the post-print reflectance signal is less than a predetermined minimum value.

36 Claims, 11 Drawing Sheets

APPARATUS AND METHOD FOR REAL-TIME MEASUREMENT OF DIGITAL PRINT QUALITY

CROSS REFERENCE TO RELATED APPLICATIONS

This application is related to the following co-pending applications filed on even date herewith and assigned to the assignee of this application: U.S. patent application Ser. No. 09/193,610, entitled MAILING MACHINE INCLUDING INK JET PRINTING HAVING PRINT HEAD MALFUNCTION DETECTION; U.S. patent application Ser. No. 09/193,609, entitled APPARATUS AND METHOD FOR REAL-TIME MEASUREMENT OF DIGITAL PRINT QUALITY; and U.S. patent application Ser. No. 09/193,607, entitled APPARATUS AND METHOD FOR MONITORING OPERATION OF AN INK JET PRINTHEAD; all of which are specifically incorporated herein by reference.

BACKGROUND OF THE INVENTION

The subject invention relates to digital printing. (As used herein, the term "digital printing" refers to any form of printing wherein print control signals control a print mechanism to produce a matrix of pixels, i.e. picture elements, having two or more intensity values to represent an image.) More particularly it relates to apparatus and methods for the real-time measurement of digital print quality.

Low cost, widely available digital printing technologies such as ink jet, bubble jet, and thermal transfer printing have enabled many new applications where dynamically varying information must be transmitted in printed form. Many of these applications rely upon a consistent level of print quality over time since the failure to capture the unique information on even a single document can have serious consequences.

A particular example of an application of digital printing where a consistent level of print quality is very important is the use of digital print mechanisms in postage meters and mailing machines. As is well known such devices print postal indicia on mailpieces as proof of the payment of postage. Upon payment to a proper authority such meters or machines are "charged" with a representation of an equivalent amount of funds. As postal indicia are printed the funds in the meter are debited accordingly until exhausted. Since postal services accept indicia printed by postage meters or mailing machines as conclusive proof of payment of the amount of postage indicated such devices are in effect machines for printing money. As a result postal services have imposed high standards both on the print quality of indicia produced by such machines, and on the design of the machines themselves to assure that the appropriate amount is debited from the amount charged into the machine for each indicia printed.

Low cost digital print technologies have greatly simplified and improved the design of postage meters and mailing machines in many respects. Prior postage meters and mailing machines relied upon impact printing techniques which required complicated and expensive mechanisms to print varying postage amounts, which can now be printed in a simple, conventional manner with digital print mechanisms. More importantly, digital print mechanisms can be easily programmed to print other information such as security codes or addressing or tracking information with the postal indicia to facilitate automated mail handling. However, such low cost digital print mechanisms can not easily provide consistent print quality as their mechanisms tend to degrade over time as ink dries up, small print nozzles clog or one or more of a number of small, rapidly cycling print elements fails. Such failure can cause substantial losses to a mailer since a large number of mail pieces of substandard print quality may be rejected by a postal service after the cost of the postage has been debited from the pre-paid amount charged to the machine.

U.S. Pat. No. 4,907,013; to: Hubbard et al.; issued: Mar. 6, 1990 is believed to be the prior art closest to the subject invention and relates to circuitry for detecting failure of one or more nozzles in an ink jet printhead. In Hubbard et al. a line containing one dot printed by each nozzle in the printhead is scanned to detect the possible absence of a dot. The line can form either a test pattern run before the start of a printing operation or can be incorporated into the image to be printed.

U.S. Pat. No. 5,038,208; to; Ichikawa et al.; issued: Aug. 6, 1991 teaches an ink jet printer which stores the image forming characteristics of an ink jet printhead and which corrects the image forming signals in accordance with the stored characteristics to maintain uniform print density.

U.S. Pat. No. 5,126,691; to: Millet et al.; issued: Jul. 7, 1992 is similar to Hubbard et al. in that it teaches a method for monitoring print quality by the use of a specially printed control frame.

U.S. Pat. No. 5,321,436; to: Herbert; issued Jun. 14, 1994 teaches a postage meter in which the operation of an ink jet printhead is checked by printing a predetermined bar code and then scanning the bar code to determine if it was correctly printed.

U.S. Pat. No. 5,473,351; to: Heterline et al. teaches a method and apparatus for monitoring print density by measuring printed line width and modifying the energy of the pulses applied to each ink jet nozzle to correct the line width.

Commonly assigned U.S. patent application, U.S. Pat. No. 6,000,774; titled: Mailing Machine Including the Prevention of Loss of Funds; filed Mar. 24, 1998, which is hereby incorporated by reference, teaches a postage meter or mailing machine having a capability for generating a test pattern; where the test pattern includes pseudo-random information unknown to an operator. Failure of the operator to correctly input the information causes the postage meter to be disabled; and correct input of the information enables the postage meter to continue operation.

While perhaps suitable for their intended purpose the print quality monitoring and control techniques found in the prior art did not provide a simple and inexpensive way to monitor print quality in real-time. Hubbard and similar prior art require special test patterns and so lack the immediate ability to detect a failure of print quality and/or the flexibility to monitor arbitrary print images; while other techniques taught in the prior art require expensive apparatus for measuring line width or printhead characteristics together with complicated control of the printhead drive signals.

Thus it is an object of the invention to provide an improved apparatus and method for the prompt, real-time monitoring of print quality so that prompt corrective actions can be taken.

BRIEF SUMMARY OF THE INVENTION

The above object is achieved and the disadvantages of the prior art are overcome in accordance with the subject invention by means of a method and apparatus for real-time monitoring of digital print quality produced by a digital printing mechanism; by providing predetermined print control signals to the digital printing mechanism, the printing mechanism responding to the print control signals to print an image on a substrate; providing a background reflectance signal representative of the background reflectance of said substrate; scanning the image to generate a post-print reflectance signal; comparing the background reflectance signal with the post-print reflectance signal; and, if the post-print reflectance signal is greater than a predetermined fraction of the background reflectance signal, generating an output signal indicative of poor print quality.

In accordance with one aspect of the subject invention, the output signal indicative of poor print quality is also generated if the post-print reflectance signal is less than a predetermined minimum value of the background reflectance signal.

In accordance with another aspect of the subject invention, the image is scanned synchronously with movement of the substrate relative to the printing mechanism.

In accordance with another aspect of the subject invention, the print mechanism is comprised in a postage metering system and the image includes a postal indicia.

In accordance with another aspect of the subject invention, the postage meter is responsive to a signal generated as a function of the output signal to inhibit further printing of postal indicia.

In accordance with another aspect of the subject invention, the printing mechanism comprises a plurality of printheads, each of the printheads printing a portion of the image.

In accordance with another aspect of the subject invention, the post-print reflectance signal includes a plurality of component signals, each of the component signals corresponding to one of the portions of the image.

In accordance with another aspect of the subject invention, each of the component signals is compared separately with the background reflectance signal and, if any of the component signals is greater than the predetermined fraction of the background reflectance signal, the output signal is generated.

In accordance with another aspect of the subject invention, each of the component signals is generated by a separate linear array of photosensors, the arrays being aligned end-to-end to form a single linear array, the single array spanning the image transversely to the direction of motion of the substrate relative to the printing mechanism.

In accordance with another aspect of the subject invention, each of the separate arrays scans the corresponding one of the portions a plurality of times so that a predetermined number of scans of the image are made and the scans are integrated for each of the corresponding portions to generate the component signals.

In accordance with another aspect of the subject invention, the integrated scans are divided by the predetermined number, whereby the component signals represent an average over the plurality of scans.

In accordance with still another aspect of the subject invention, the background reflectance signal is compared with the post-print reflectance signal to classify the post-print reflectance signal as being satisfactory, unsatisfactory, or doubtful; and if the post-print reflectance signal is unsatisfactory, generating an output signal indicative of poor print quality; and if the post-print reflectance signal is doubtful, printing a test pattern and waiting for an operator response; and then if the operator response indicates the test pattern is acceptable, accepting the indicia and continuing operation of the printing mechanism; and if the operator response indicates the test pattern is unacceptable, rejecting the indicia and generating the output signal indicative of poor print quality; and if the operator response indicates the test pattern is acceptable, adjusting the comparison to classify a greater portion of post-print reflectance signals as satisfactory; and if the operator response indicates the test pattern is unacceptable, adjusting the comparison to classify a greater portion of post-print reflectance signals as unsatisfactory.

In accordance with still another aspect of the subject invention, the comparison is adjusted so as to classify a lesser portion of the post-print reflectance signals as doubtful.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
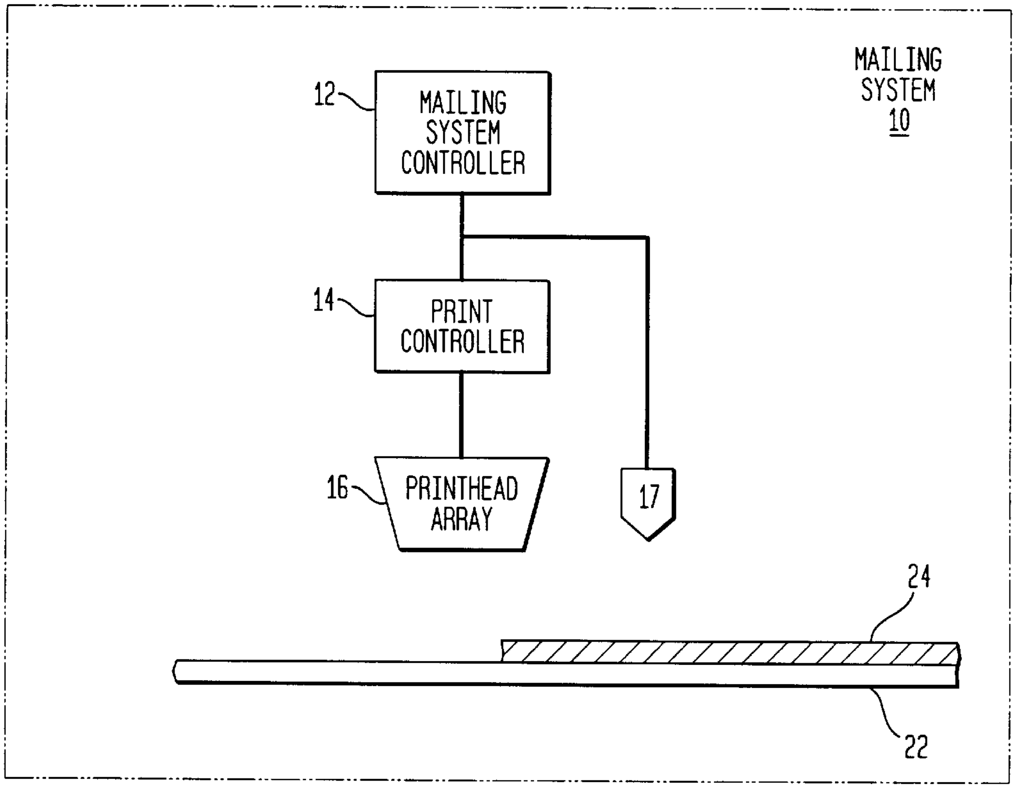
FIG. 1 (PRIOR ART)
FIG. 1 is a simplified block diagram of a prior art mailing system.

FIG. 1 shows a simplified block diagram of a conventional mailing system 10, which can be a postage meter or mailing machine or other known apparatus for the preparation of mail which include a postage metering function and which digitally prints postal indicia. System 10 includes controller 12 for controlling postage meter functions, such as accounting for postage expended, in a conventional manner well known to those skilled in the art. Controller 12 responds to appropriate inputs to determine the variable content of a postal indicia such as postal amount, the date, or variable encrypted information. Controller 12 then controls a print mechanism comprising print controller 14 and printhead array 16 to print indicia 24 on substrate 22. Controller 12 also controls a fluidic solenoid valve 17 which applies a fluorescent tag 50 (shown in FIG. 2) used by postal service equipment, as will be described further below.

Figure 2:
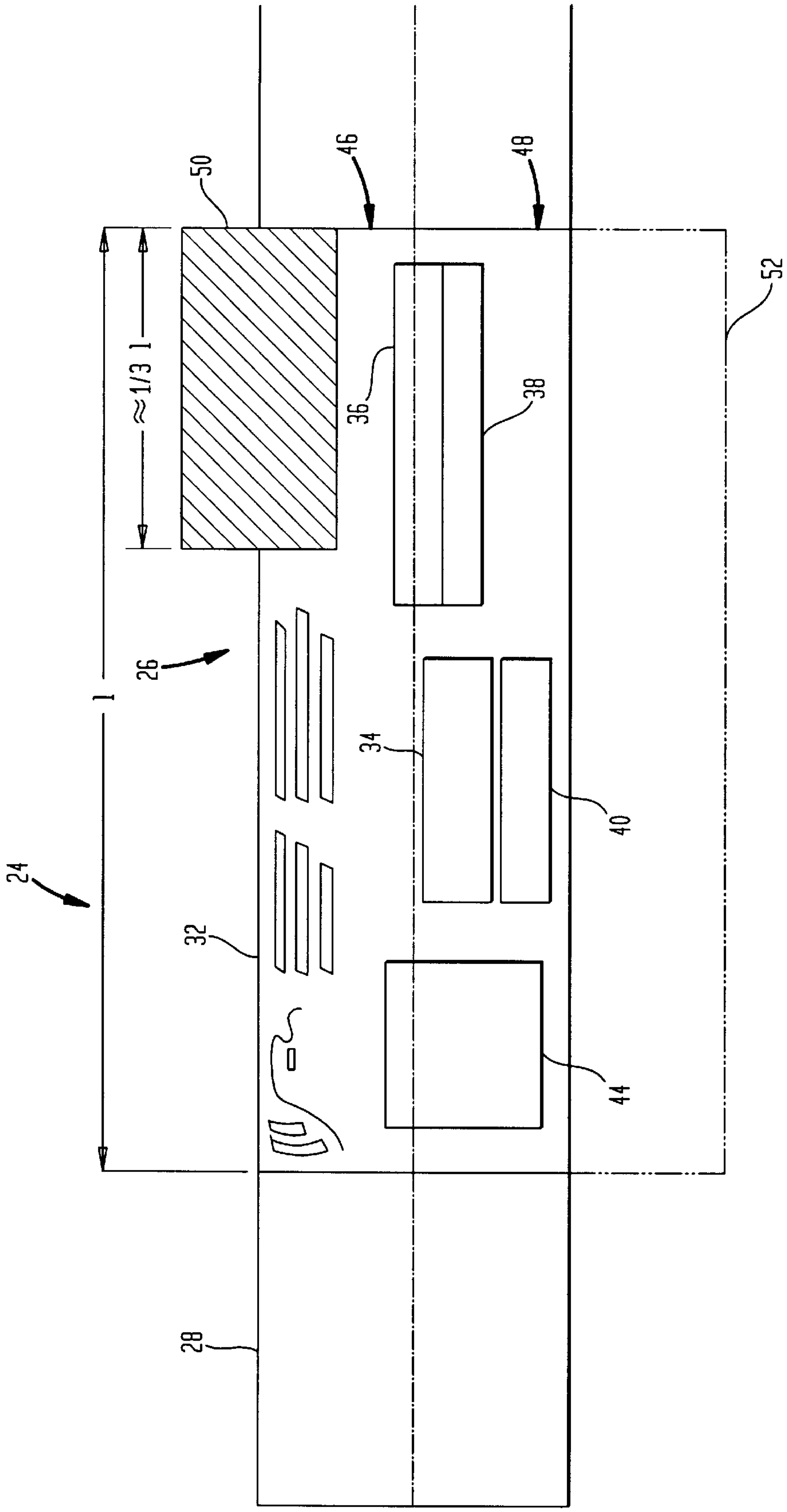
FIG. 2 (PRIOR ART)
FIG. 2 is a representation of a postal indicia of the type typically printed by the system of FIG. 1.

FIG. 2 shows a typical digitally printed indicia 24 which includes a postal indicia 26 and arbitrary ad slogan 28 which is specified by the system user. Typically postal indicia 26 includes manufacturer's logo 32 and a plurality of fields containing alphanumeric information. Field 34 contains the postage amount represented by the indicia, field 36 contains the meter serial number, field 38 contains the date, field 40 contains the "mailed from" zip code, and field 44 contains encrypted information which can be used to validate the indicia in a known manner. Other digitally printed indicia can include information in other forms such as a barcode.

Indicia 24 has length "I" and comprises two horizontal portions or bands 46 and 48 printed by two or more corresponding printheads in array 16. For indicia printed with black ink approximately the first third of upper band 46 is substantially unprinted and a fluorescent ink tag 50 is applied by valve 17. Tag 50 is used by postal service processing equipment to orient mail pieces. Indicia printed with red ink are detectable without need for tag 50. (Note, tag 50 can extend beyond the borders of indicia 24 and a portion of field 36, or other printed material, may impinge on the first third of band 46.) Preferably, region 52 adjacent to postal indicia 26 is unprinted and is used to generate a background reflectance signal, as will be described further below.

Figure 3:
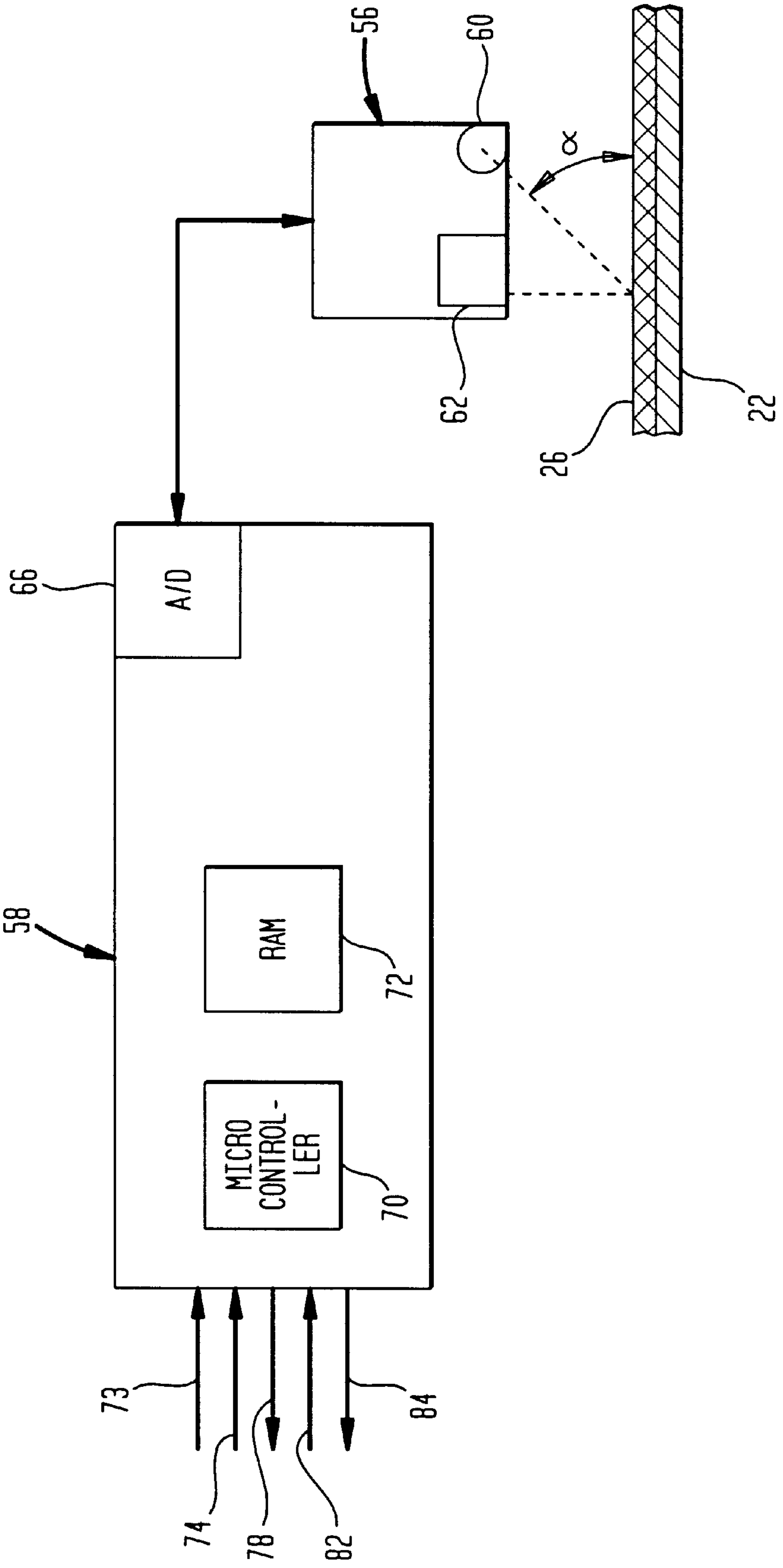
FIG. 3 is a schematic block diagram of a detector module and associated controller in accordance with the subject invention.

As discussed above the ability to scan such information from digitally printed indicia is considered by the postal service to be critical to the metered mail system. FIG. 3 shows an embodiment of the subject invention which can be incorporated into mailing systems with minimal design change, or which can be retrofitted into existing mailing systems, to provide real-time measurement of print quality so that prompt action can be taken, and the loss of postage expended can be minimized, in the event print quality deteriorates.

In FIG. 3 an apparatus in accordance with the subject invention comprises detector module 56 and indicia sensor controller 58. (In other embodiments of the subject invention detector 56 and controller 58 can be incorporated into a single module.)

Detector module 56 includes LED array 60 and photodiode array 62. LED array 60 illuminates postal indicia 26 and substrate 22. Preferably array 60 is selected to maximize the reflectance contrast between printed and unprinted areas. For typical choices of inks and substrate stock a green light of approximately 570 nanometers has proven satisfactory. Photodiode array 62 is positioned to sense reflected light from strips of postal indicia 26 and region 52 which are oriented transversely to the direction of motion of substrate 22 and generates a sequence of analog outputs which are proportional to the integrated reflectance of successively sensed strips. Preferably array 60 is arranged to illuminate postal indicia 26 at an angle "a" such that array 62 receives diffuse reflected light.

Indicia sensor controller 58 includes analog-to digital converter 66, microcontroller 70 and RAM memory 72 and controls detector module 56 to scan postal indicia 26; and receives, converts to digital form, and process the output of module 56 to detect printing faults, as will be described more fully below. Indicia sensor controller 58 receives a "printhead fire" signal mailing system controller 12 on input 73 and a "dot clock" signal from an encoder (not shown) on the main transport belt (not shown) of mailing system 10 on input 74. The "printhead fire" signal is generated to initiate printing of an indicia. Detector module 56 is positioned a predetermined distance downstream from printhead 16 and microcontroller 70 is preprogrammed to count a corresponding number of "dot clocks" after the "printhead fire" signal is received before starting scanning. Since the "dot clock" is generated from an encoder on the main transport the number of clock pulses received is directly proportional to distance traveled regardless of transport speed, (which will vary in a servo controlled transport system such as are typically used in mailing systems) and controller 58 is assured of scanning the correct area. Analog outputs representative of the integrated reflectance of each scan segment are received by A/D converter 66 and stored in digital form in RAM 72 for further processing. If Indicia sensor controller 58 detects a printing fault a "stop" signal is output to mailing system controller 12 on output 78. Preferably system controller 12 returns a response requesting the status of the fault over receive input 82 and indicia sensor controller 58 will return status over transmit output 84, as will be described further below.

Figure 4:
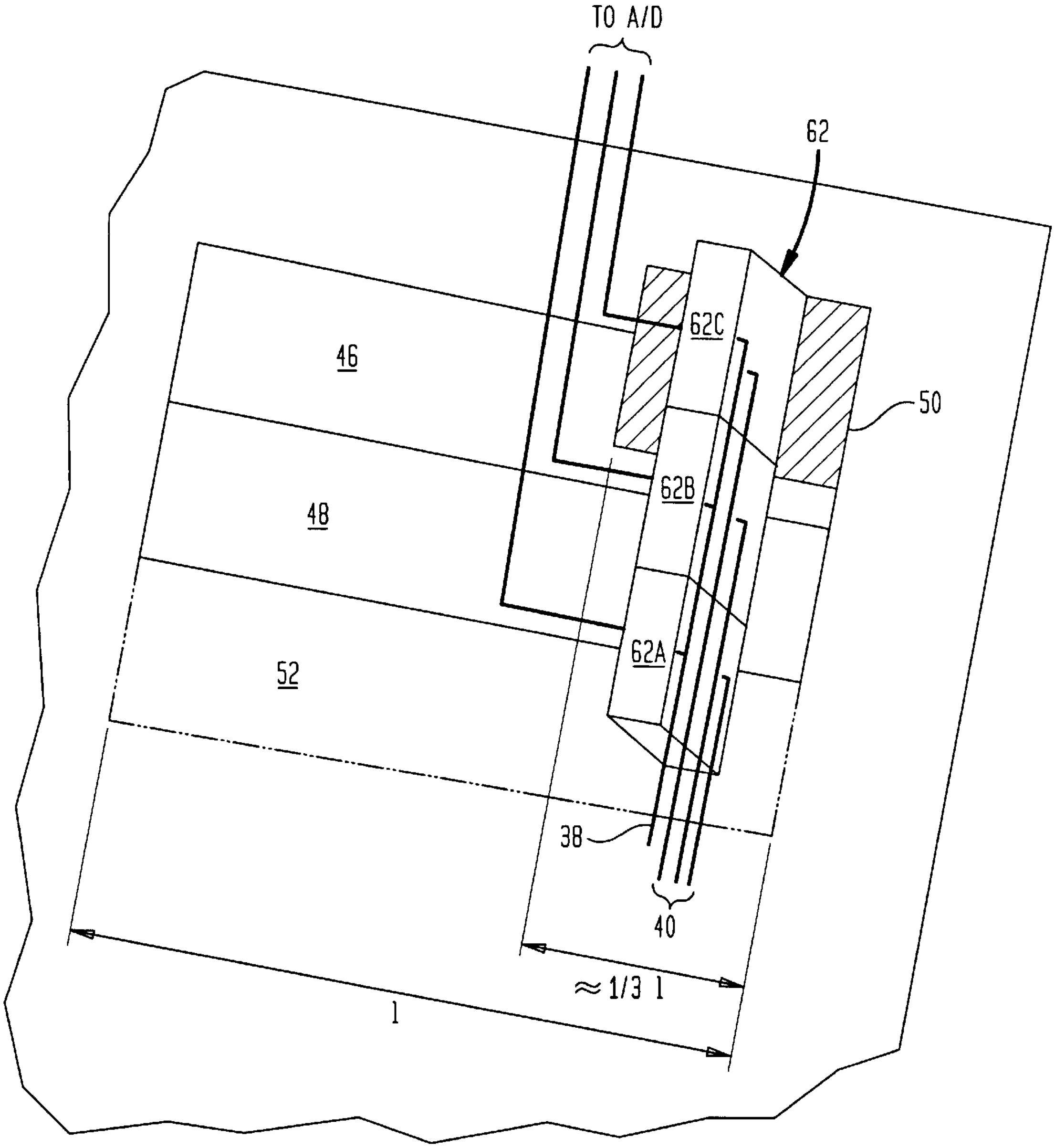
FIG. 4 is a schematic representation of a scanning configuration used in one embodiment of the subject invention.

Turning to FIG. 4 a more detailed schematic representation of the scanning configuration of a preferred embodiment of the subject invention is shown. Photodiode array 62 comprises a plurality of separate, linear arrays: 62A, 62B, and 62C, aligned end-to-end to form a single array which is positioned transversely to the relative direction of motion of substrate 22, and which spans postal indicia 26 and unprinted region 52. Postal indicia 26 comprises bands 46 and 48 each printed by a separate printhead in printhead array 16. Bands 46 and 48 comprise the upper and lower portions of postal indicia 26, while tag 50 is applied to the substantially unprinted first third of band 46 by valve 17 to provide a tag used by postal service mail handling equipment to orient mail pieces during processing.

After scanning is initiated by controller 58 each dot clock signal causes each of linear arrays 62A, 62B, and 62C to scan a transverse strip of its corresponding band. Accordingly, in at least one embodiment, the image and non-print regions are scanned simultaneously. During each scan each of arrays 62A, B, and C sample 128 pixels in its corresponding band (or region 52). Dot clock signals are input proportionally to the movement of substrate 22 on input 38 until postal indicia 26 is completely scanned. (Preferably, slogan 28 is not scanned.) Between scan signals each array integrates the reflectance values sensed for each pixel to generate an analog value proportional to the integrated reflectance of the scanned strip. A strobe is then gated by conventional logic circuits (not shown) successively to each of linear arrays 62A, 62B and 62C on inputs 40. As the outputs of each array are output they are digitized by A/D converter 66 and stored in RAM 70 for each linear array (and corresponding band or region).

Those skilled in the art will recognize that, with routine changes to scanning control software, other formats of indicia and/or configurations of photodiode arrays can readily be used in the subject invention. Particularly, if there is concern about the print quality unscanned portion of tag 50 (some postal equipment may fail to recognize tag 50 if it is only partially printed) a fourth linear array can be added to extend photodiode array 62 to cover the whole of tag 50. Preferably the four arrays can be packaged in two linear dual element packages which are mounted in line with approximately a ⅛ inch space between packages to span substantially all of indicia 26 and tag 50. Such a configuration would function in substantially the same manner as the configuration of FIG. 4, and necessary modifications to incorporate a forth linear array would be within the ability of a person skilled in the art.

FIGS. 5A through 5E show a flow diagram of the operation of an apparatus substantially similar to the apparatus of FIG. 3 in accordance with the method of the subject invention. Indicia sensor controller 58 is connected to communicate with mailing system controller 12, and detector module 56 is positioned proximate to and downstream of printhead array 16. Necessary modifications to the software of controller 12 to incorporate the apparatus of FIG. 3 will be readily apparent to, and easily within the skill of, those skilled in the art.

At 100 the apparatus is initialized. At 102 the apparatus waits for a printhead fire signal indicating that the printed indicia is in position for scanning. When the signal is received controller 58 counts a predetermined number of dot clocks to allow indicia 24 to reach detector module 56 and a scan is taken, at 104, of a transverse segment of postal indicia 26 by photodiode array 62. At 106 the contents of one of linear arrays 62A, B and C are integrated and strobed out to A/D converter 66. At 108 the result is digitized. At 110 the digitized value for that scan is stored for that array (and thus for the corresponding portion of the indicia). At 112 the apparatus determines if the last linear array has been processed. If not the apparatus returns to 106 to process the next linear array, continuing until the contents of each array for the scan have been integrated and stored. Then at 114 the apparatus determines if the last scan has been completed and, if not, returns to 104.

The scanning rate is determined by the time required for each of arrays 62A, B and C to integrate the reflectance of each pixel in the scan to generate an analog reflectance value for the scan. The total number of scans is determined by the scanning rate, the relative velocity of the substrate, and the length of the indicia. For a photodiode array comprising three, 128 bit, linear arrays this time has been found to be approximately 1 millisecond giving a scanning rate of 1 KHz. For an indicia 3 inches in length with a relative velocity of 40 inches/sec. this gives approximately 72 scans on an indicia. At a print density of 240 dpi approximately 10% of the printed pixels will be scanned.

Once postal indicia 26 has been scanned indicia sensor controller 58 processes the data received from detector module 56 to determine if a printing fault has occurred.

Figure 5A:
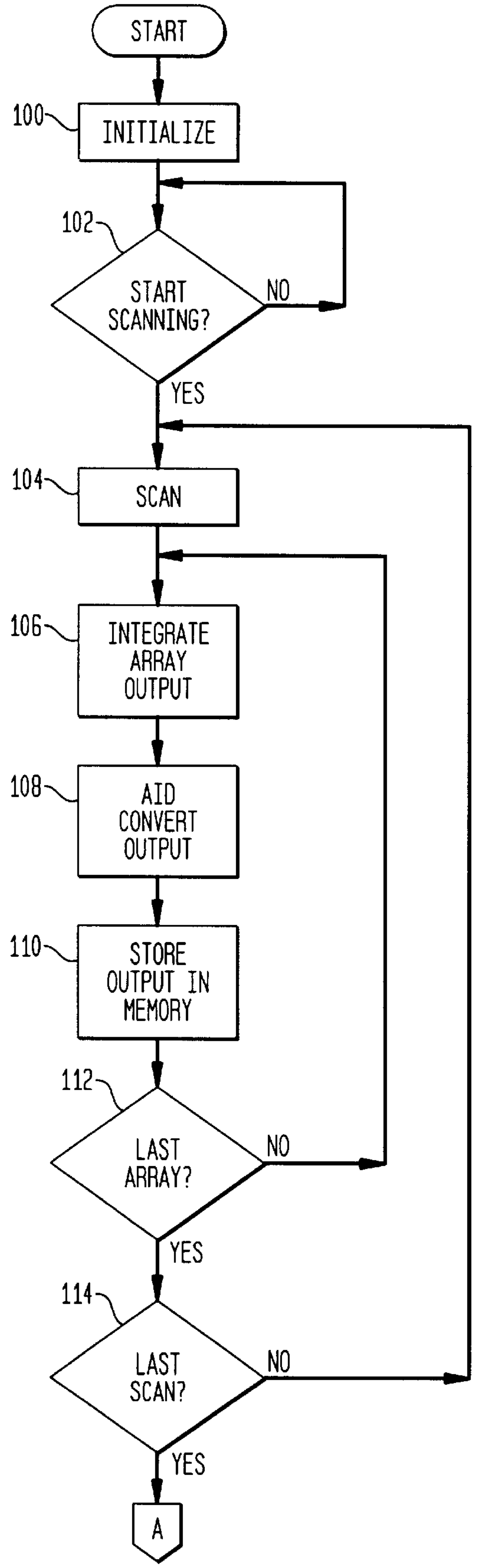
FIGS. 5A–5E show a flow diagram of the operation of one embodiment of the subject invention.
Figure 5B:
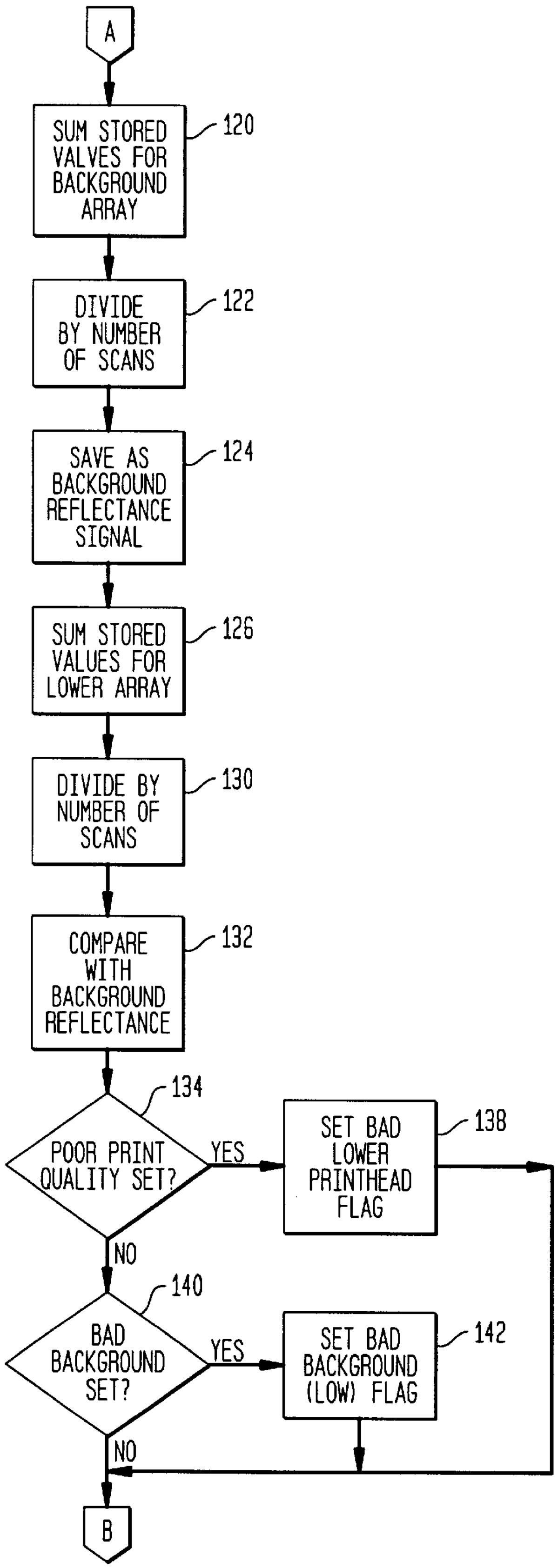
Figure 5C:
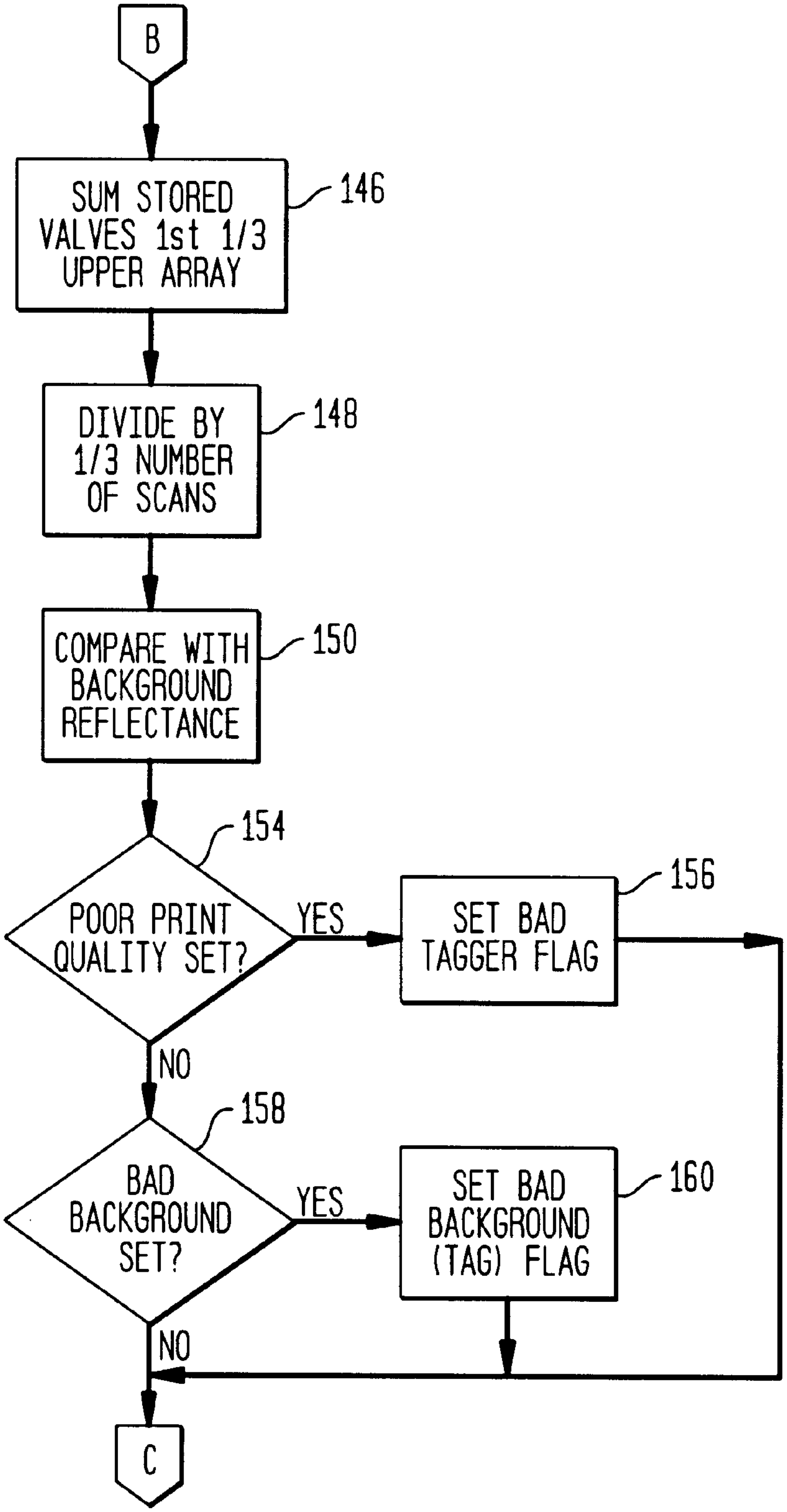
Figure 5D:
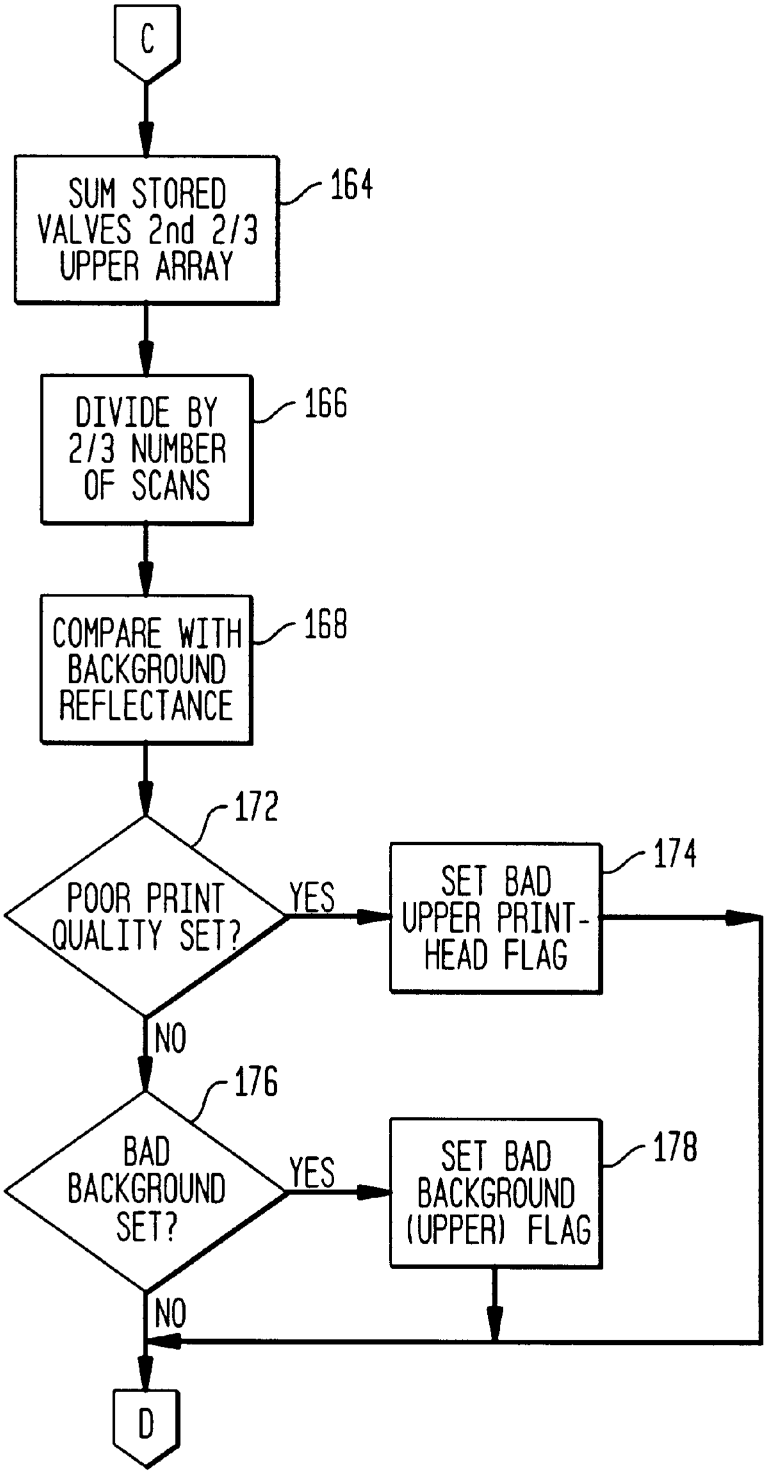
Figure 5E:
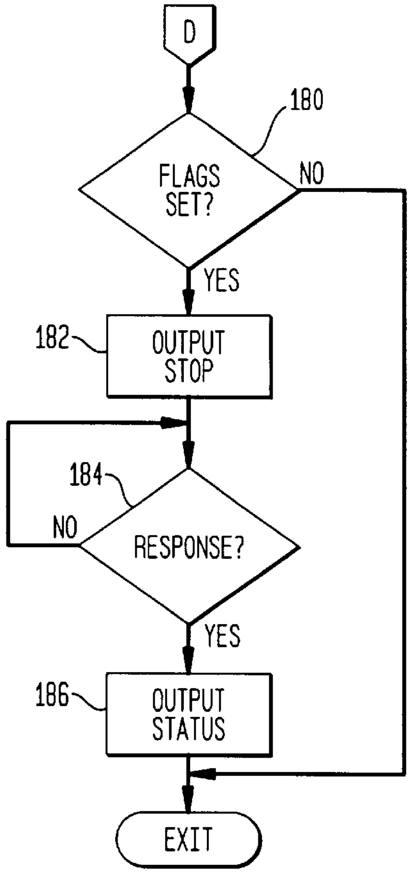

In FIG. 5B, at 120, microcontroller 70 sums the background values (i.e. the values for region 52) and, at 122, divides the sum by the number of scans to get the average reflectance for region 52. At 124 the result is saved as the background reflectance signal.

Then at 126, microcontroller 70 sums the values for lower band 48 and, at 130, divides by the number of scans to get the component of the post-print. reflectance signal for lower band 48. At 132 this component is compared with the background reflectance signal; as will be described in more detail with respect to FIG. 6. At 134 microcontroller 70 tests the comparison results and if a poor print quality flag is set, at 138 sets a bad lower printhead flag and goes to 146. If the poor print quality flag is not set, at 140 microcontroller 70 tests for a bad background flag. If it is set, at 142 a bad background (low band) flag is set and microcontroller 70 goes to 146 in FIG. 5C. Otherwise microcontroller 70 goes directly to 146.

Then at 146, microcontroller 70 sums the values for the first third of upper band 46 and, at 130, divides by one-third the number of scans to get the component of the post-print reflectance signal for tag 50. At 150 this component is compared with the background reflectance signal. At 154 microcontroller 70 tests the comparison results and if a poor print quality flag is set, at 156 sets a bad tagger flag and goes to 164. if the poor print quality flag is not set, at 158 microcontroller 70 tests for a bad background flag. If it is set, at 160 a bad background (tag) flag is set and microcontroller 70 goes to 164 in FIG. 5D. Otherwise microcontroller 70 goes directly to 164.

Then at 164 microcontroller 70 sums the values for the remaining two-thirds of upper band 46 and, at 166, divides by two-thirds the number of scans to get the component of the post-print reflectance signal for upper band 48. At 168 this component is compared with the background reflectance signal; as will be described in more detail with respect to FIG. 6. At 172 microcontroller 70 tests the comparison results and if a poor print quality flag is set, at 174 sets a bad upper printhead flag and goes to 180. If the poor print quality flag is not set, at 176 microcontroller 70 tests for a bad background flag. If it is set, at 178 a bad background (upper band) flag is set and microcontroller 70 goes to 180 in FIG. 5E. Otherwise microcontroller 70 goes directly to 180.

At 180 microcontroller 70 tests to determine if any flags are set. If not microcontroller 70 exits to await the next indicia. If any flags are set, at 182 a stop signal is output to the mailing system, and, at 184 microcontroller 70 waits for a response from mailing system controller 12 requesting the status of the detected print fault. When the response is received microcontroller 70 outputs the state of the various flags to mailing system controller 12.

Figure 6:
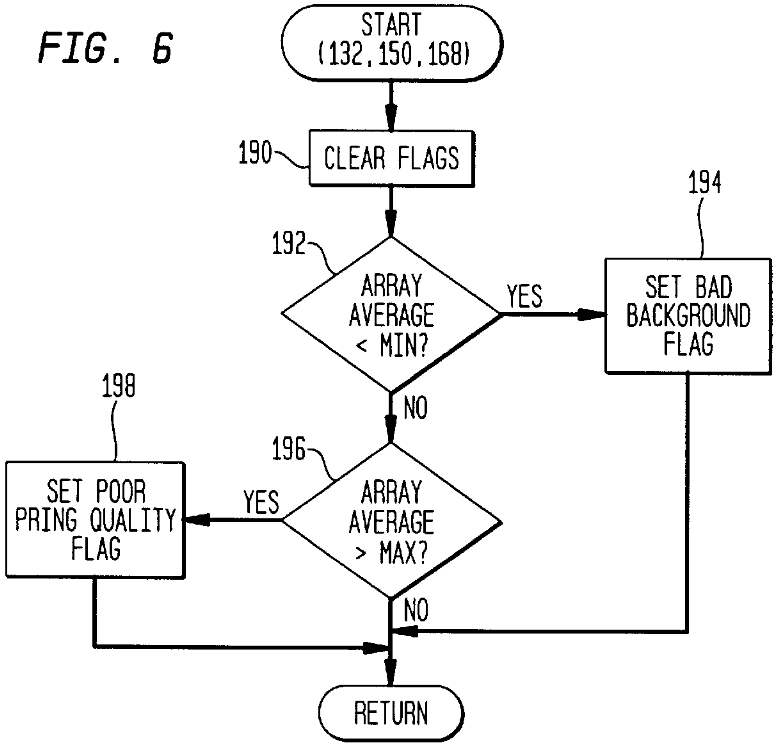
FIG. 6 shows a more detailed flow diagram of comparison steps of FIGS. 5A–5E.

Turning to FIG. 6, a more detailed flow diagram of comparison steps 132, 150 and 168 is shown. At 190 all flags in the comparison step are cleared. At 192 it is determined if the array average being compared is less than the minimum level. If it is, then at 122 a bad background flag is set and the apparatus returns. Returning to 192, if the average array sum is not less than the lower threshold, then at 196 it is determined if the array average being compared is greater than the maximum level. If it is, then at 198 a poor print quality flag is set and the apparatus returns. If the array average being compared is not greater than the maximum, the apparatus returns.

In the comparison step of FIG. 6, the minimum at 192 is selected to detect failure modes where a printhead fires all its nozzles for each firing cycle or otherwise ejects to much ink or the use of a substrate having too low a reflectance. This can easily be determined by those skilled in the art from knowledge of the reflectance of the ink used, and the approximate fraction of the indicia, or portion of the indicia, which is printed. The maximum at 196 is selected as a fraction of the background reflectance signal. Ninety percent is believed to be an effective value. For values of the post-print reflectance signal greater than the selected fraction of the background reflectance signal it is assumed that insufficient ink has been ejected, e.g. less than 90% of postal indicia 26 has been printed.

It should be noted that, while the subject invention provides a real-time signal which is indicative of digital print quality produced by a mailing system or the like, many forms which the particular response of the system can take will be readily apparent to those skilled in the art. For example, because in the indicia of FIG. 2 the upper printhead can print in a small part of the first third of the upper band failure of the upper printhead may cause a poor print quality signal for both band 56 and tag 50 even though tag 50 is good. This can easily be handled by programming the system to alert the operator to this possibility so that valve 17 is not needlessly replaced. Similarly, a bad background (i.e. the post-print reflectance signal is below the minimum) can result from either a failure of a printhead which causes it to print all black or a substrate which has low reflectance (e.g. a black envelope for use with black ink). This can be handled by noting that a bad background result for all components of the post-print signal will almost always be the result of a defective substrate. Alternatively, in another embodiment of the subject invention, the background reflectance signal derived from region 52 can be tested directly against a predetermined minimum to assure that the substrate has adequate reflectance.

Figure 7:
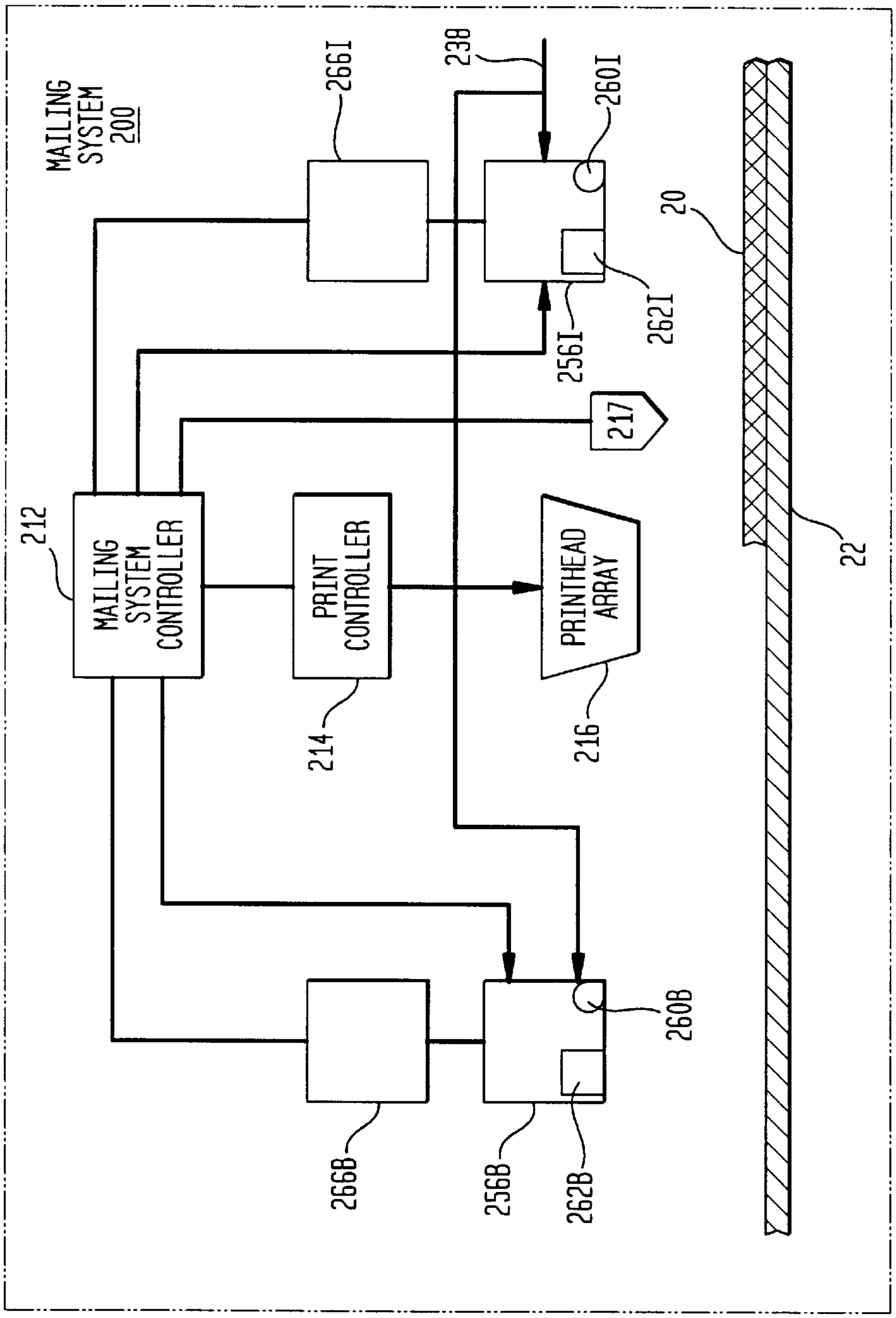
FIG. 7 is a block diagram of another embodiment of the subject invention.

FIG. 7 shows an embodiment of the subject invention in which an apparatus and method for real-time measurement of digital print quality are incorporated into the initial design of mailing system 200 which can be a postage meter or mailing machine or other known apparatus for the preparation of mail which include a postage metering function and which digitally prints postal indicia. System 200 includes. controller 212 for controlling postage meter functions, such as accounting of for postage expended, in a conventional manner well known to those skilled in the art. Controller 212 responds to appropriate inputs to determine the variable content of a postal indicia such as postal amount, the date, or variable encrypted information. controller 212 then controls a print mechanism comprising print controller 214 and printhead array 216 to print indicia 24 on substrate 22. Controller 212 also controls a fluidic solenoid valve 217 which applies fluorescent tag 50 used by postal service equipment, as described above. Through sensor controller 266I, mailing system controller 212 also controls and receives data from detector module 256I, which includes photodiode array 262I and LED array 260I, to scan postal indicia 26 synchronously with dot clock input 238 and generate a post-print reflectance signal substantially as described above with reference to FIGS. 3 and 4. Detector module 256I differs from detector module 56 in that it is configured to scan only postal indicia 26 and does not scan an unprinted region. In the embodiment shown in FIG. 7 system controller 212 also controls detector module 256B, which is essentially identical to module 256I and includes photodiode array 262B and LED array 260B, through sensor controller 266B, and receives data from detector module 256B positioned upstream from printhead array 216 to scan the area in which postal indicia 26 will be printed synchronously with dot clock input 238 and generate a background reflectance signal, prior to printing the indicia. In a preferred embodiment the background reflectance signal is generated in a manner in substantially identical to the manner in which the post-print reflectance signal is generated since this will allow the background reflectance and post-print reflectance signals to be directly compared; and, by scanning the area in which the indicia will be printed, correction for variability in the reflectance of different parts of substrate 22, such as that caused by pre-printed markings, can be made for each component of the post-print signal. A further advantage of pre-print scanning of background reflectance is that an unprinted region such as region 52 may be difficult to find on a mail piece. For example on a 3×5 card with a return address and large ad slogan there may be no suitable unprinted region which can be scanned to determine the background reflectance signal.

As noted with regard to FIG. 7, the background reflectance signal is generated by scanning the indicia area, before printing, in a manner substantially identical to the manner in which the printed indicia is scanned, so that the background reflectance signal also comprises components which are directly comparable with the corresponding components of the post-print reflectance signal. This embodiment provides a maximal capability to correct for variations in reflectance within a particular substrate 22. However in other applications the variation within particular substrates, or even between substrates, may not be significant. In such applications areas other than, and differing in size and/or shape from the area of the indicia, can be scanned by a separate linear array, or by array 24 before or after postal indicia 26 is scanned to generate a background reflectance signal. Or, if the variation in reflectance between substrates is not significant, an average background reflectance signal can be input for a mail run. In these cases, to maintain compatibility between the post print signal and the background reflectance signal, each array sum is divided by the number of scans on the indicia to generate an average array sum for each array as the components of the post-print reflectance signal, and the background reflectance signal is similarly normalized.

Figure 8:
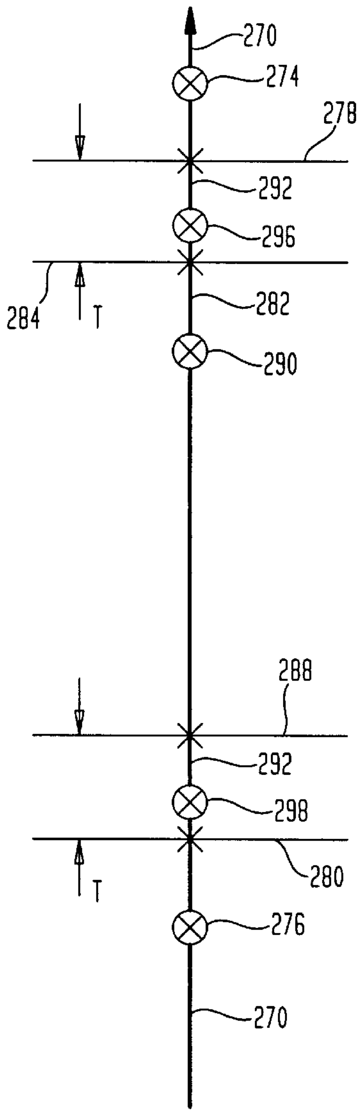
FIG. 8 shows comparison logic which can be used in the embodiment of FIG. 7.

FIG. 8 shows a representation of the comparison logic which can be used in the embodiment of FIG. 7 to compare the post-print reflectance signal with the background reflectance signal and classify the post-print reflectance signal (and thus the print quality) as satisfactory, unsatisfactory, or doubtful. Post-print reflectance signal values in range 270, such as value 274 which is above maximum level 278, or value 26 which is below minimum level 280, are classified as unsatisfactory. Since the actual post-print reflectance values are computed by system controller 212 this information can be used to adaptively adjust the comparison logic to reduce the number of doubtful cases, as will be described further below.

Minimum 280 is selected to detect failure modes where a printhead fires all its nozzles for each firing cycle or otherwise ejects to much ink. Minimum 280 can easily be determined by those skilled in the art from knowledge of the reflectance of the ink used, and the approximate fraction of the indicia, or portion of the indicia, which is printed. Level 278 is selected as a fraction of the background reflectance signal. Ninety percent is believed to be an effective initial value, subject to adjustment as will described below. For values of the post-print reflectance signal greater than the selected fraction of the background reflectance signal, such as value 274, it is assumed that insufficient ink has been ejected, e.g. less than 90% of postal indicia 26 has been printed.

For post-print reflectance signal values in region 282, which is bounded by upper threshold 284 and lower threshold 288, such as value 290, the post-print reflectance signal is classified as satisfactory. Thresholds 284 and 288 are offset from maximum 278 and minimum 280 by a predetermined threshold amount T. The precise value for threshold amount T is not critical and at least an initial value can readily be determined by simple experimentation.

Post-print reflectance signal values in range 292, such as value 296 which is between maximum 278 and upper threshold 284, or value 298, which is between minimum 280 and lower threshold 288, are classified as doubtful and a test pattern is printed and output for inspection by an operator. If the operator provides input indicating that the test pattern is acceptable the post-print reflectance signal is treated as satisfactory and if the test pattern is not acceptable the post-print reflectance signal is treated as unsatisfactory. In a preferred embodiment of the subject invention the test pattern includes variable information not known to the operator, such as a pseudo-random number and an acceptable test pattern is identified by input of the variable information. Preferably the variable information is chosen so that printing it in the test pattern exercises all of the ink jets in printhead array 16.

Figure 9A:
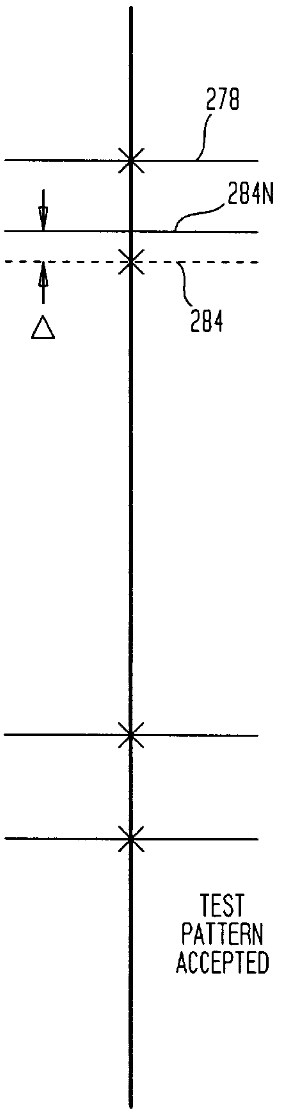
FIGS. 9A and 9B show an improved version of the logic of FIG. 8 wherein test results are used to refine the comparison.
Figure 9B:

FIGS. 9A and 9B show a representation of the comparison logic of FIG. 8 in an embodiment wherein the results of examination of the test pattern are used to refine the comparison. Assuming that the post-print reflectance signal value is between maximum level 278 and upper threshold 284, FIG. 9A shows the adjustment made if the test pattern is accepted—upper threshold 284 is increased by a predetermined amount "delta"; increasing region 282 and the likelihood that post-print reflectance signal values will be classified as satisfactory, and decreasing range 292 and the likelihood that post-print reflectance signal values will be classified as doubtful. FIG. 9B shows the adjustment made if the test pattern is not accepted—maximum level 278 is decreased by a predetermined incremental amount "delta"; increasing region 290 and the likelihood that post-print reflectance signal values will be classified as unsatisfactory, and decreasing range 292 and the likelihood that post-print reflectance signal values will be classified as doubtful.

The amount "delta" is not critical and a satisfactory value can readily be determined by experimentation.

As will be apparent to those skilled in the art a similar adjustment is made for post-print reflectance signal values between lower threshold 288 and minimum 280.

It will also be apparent to those skilled in the art that the maximum and minimum levels to be adjusted as described above can be defined in terms of reference signals other than the background reflectance signal, for example the maximum and minimum allowable difference between the post-print reflectance signal and a reference signal derived from print control signals defining the indicia. Such a reference signal is described in commonly assigned U.S. Pat. No. 6,435,642 filed on even date herewith.

Other methods of refining the comparison logic are also within the contemplation of the subject invention and any convenient method which incrementally increases the likelihood that the post-print reflectance signal will be classified as satisfactory if the test pattern is accepted, and will be classified as unsatisfactory if the test pattern is not accepted, can be used in accordance with the subject invention.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for monitoring print quality produced by a digital printing mechanism, said method comprising the steps of:

providing predetermined print control signals to said digital printing mechanism, said printing mechanism responding to said print control signals to print an image on a substrate;

simultaneously scanning said image on said substrate to generate a post-print reflectance signal and a non-print region of said substrate to generate a background reflectance signal representative of the background reflectance-of said substrate;

comparing said background reflectance signal with said post-print reflectance signal; and if said post-print reflectance signal is greater than a predetermined fraction of said background reflectance signal, generating an output signal indicative of poor print quality.

2. A method as described in claim 1 wherein if said post-print reflectance signal is less than a predetermined minimum value said output signal indicative of poor print quality is generated.

3. A method as described in claim 1 wherein said image is scanned synchronously with movement of said substrate relative to said printing mechanism.

4. A method as described in claim 1 wherein said print mechanism is comprised in a postage metering system and said image includes a postal indicia.

5. A method as described in claim 4 wherein said postage meter is responsive to a signal generated as a function of said output signal to inhibit further printing of postal indicia.

6. A method as described in claim 1 wherein said printing mechanism comprises a plurality of printheads, each of said printheads printing a portion of said image.

7. A method as described in claim 6 wherein said post-print reflectance signal comprises a plurality of component signals, each of said component signals corresponding to a part of said image.

8. A method as described in claim 7, wherein each of said component signals is compared separately with said background reflectance signal and, if any of said component signals is greater than said predetermined fraction of said background reflectance signal, said output signal is generated.

9. A method as described in claim 8 wherein each of said component signals is generated by a separate linear array of photosensors, said arrays being aligned end-to-end to form a single linear array, said single array spanning said image transversely to the direction of motion of said substrate relative to said printing mechanism.

10. A method as described in claim 9 wherein each of said separate arrays scans said corresponding one of said parts a plurality of times so that a predetermined number of scans of said image are made and, said scans are integrated for each of said corresponding portions to generate said component signals.

11. A method as described in claim 10 wherein said integrated scans are divided by said predetermined number, whereby said component signals represent an average over said plurality of scans.

12. A method as described in claim 1 wherein said background reflectance signal is compared with said post-print reflectance signal to classify said post-print reflectance signal as being satisfactory, unsatisfactory, or doubtful; and a) if said post-print reflectance signal is unsatisfactory, generating an output signal indicative of poor print quality; and b) if said post-print reflectance signal is doubtful, printing a test pattern and waiting for an operator response; and then b1) if said operator response indicates said test pattern is acceptable, accepting said indicia and continuing operation of said printing mechanism; and b2) if said operator response indicates said test pattern is unacceptable, rejecting said indicia and generating said output signal indicative of poor print quality; and c) if said operator response indicates said test pattern is acceptable, adjusting said comparison to classify a greater portion of post-print reflectance signals as satisfactory; and d) if said operator response indicates said test pattern is unacceptable, adjusting said comparison to classify a greater portion of post-print reflectance signals as unsatisfactory.

13. A method as described in claim 12 wherein said test pattern includes variable information not known to said operator and said operator response indicates said test pattern is acceptable if it correctly includes said variable information, and said operator response indicates said test pattern is unacceptable if it does not correctly include said variable information.

14. A method as described in claim 12 wherein said comparison is adjusted so as to classify a lesser portion of said post-print reflectance signals as doubtful.

15. A method as described in claim 1 wherein the non-print region of said substrate is proximate to said image and aligned transversely to relative direction of motion of said substrate and said digital printing mechanism.

16. A method for monitoring print quality produced by a digital printing mechanism, said method comprising the steps of:

a) providing predetermined print control signals to said digital printing mechanism, said printing mechanism responding to said print control signals to print an image on a substrate;

b) providing a reference signal;

c) scanning said image to generate a post-print reflectance signal;

d) comparing said reference signal with said post-print reflectance signal to classify said post-print reflectance signal as being satisfactory, unsatisfactory, or doubtful; then e) if said post-print reflectance signal is unsatisfactory, generating an output signal indicative of poor print quality; and f) if said post-print reflectance signal is doubtful, printing a test pattern and waiting for an operator response; and then f1) if said operator response indicates said test pattern is acceptable, accepting said indicia and continuing operation of said printing mechanism; and f2) if said operator response indicates said test pattern is unacceptable, rejecting said indicia and generating said output signal indicative of poor print quality; and g) if said operator response indicates said test pattern is acceptable, adjusting said comparison to classify a greater portion of post-print reflectance signals as satisfactory; and h) if said operator response indicates said test pattern is unacceptable, adjusting said comparison to classify a greater portion of post-print reflectance signals as unsatisfactory.

17. A method as described in claim 16 wherein said test pattern includes variable information not known to said operator and said operator response indicates said test pattern is acceptable if it correctly includes said variable information, and said operator response indicates said test pattern is unacceptable if it does not correctly include said variable information.

18. A method as described in claim 16 wherein said comparison is adjusted so as to classify a lesser portion of said post-print reflectance signals as doubtful.

19. An apparatus for monitoring print quality produced by a digital printing mechanism, comprising:

means for providing predetermined print control signals to said digital printing mechanism, said printing mechanism responding to said print control signals to print an image on a substrate;

means for simultaneously scanning said image on said substrate to generate a post-print reflectance signal and a non-print region of said substrate to generate a background reflectance signal representative of the background reflectance of said substrate, where the non-print region of said substrate is proximate to and in alignment with said image as viewed in a direction along said digital printing mechanism; and comparison means for:

comparing said background reflectance signal with said post-print reflectance signal; and if said post-print reflectance signal is less than a predetermined minimum value or is greater than a predetermined fraction of said background reflectance signal, generating an output signal indicative of poor print quality.

20. An apparatus as described in claim 19 wherein if said post-print reflectance signal is less than a predetermined minimum value said output signal indicative of poor print quality is generated.

21. An apparatus as described in claim 19 wherein said image is scanned synchronously with movement of said substrate relative to said printing mechanism.

22. An apparatus as described in claim 19 wherein said print mechanism is comprised in a postage metering system and said image includes a postal indicia.

23. An apparatus as described in claim 22 wherein said postage meter is responsive to a signal generated as a function of said output signal to inhibit further printing of postal indicia.

24. An apparatus as described in claim 19 wherein said printing mechanism comprises a plurality of printheads, each of said printheads printing a portion of said image.

25. An apparatus as described in claim 24 wherein said post-print reflectance signal comprises a plurality of component signals, each of said component signals corresponding to a part of said image.

26. An apparatus as described in claim 25, wherein each of said component signals is compared separately with said background reflectance signal and, if any of said component signals is greater than said predetermined fraction of said background reflectance signal, said output signal is generated.

27. An apparatus as described in claim 26 wherein said scanning means comprises a plurality of linear arrays of photosensors, said arrays being aligned end-to-end to form a single linear array, said single array spanning said image transversely to the direction of motion of said substrate relative to said printing mechanism; wherein each of said component signals is generated by a separate one of said linear arrays.

28. An apparatus as described in claim 27 wherein each of said separate arrays scans said corresponding one of said parts a plurality of times so that a predetermined number of scans of said image are made and, said scans are integrated for each of said corresponding portions to generate said component signals.

29. An apparatus as described in claim 28 wherein said comparing means comprises means for dividing said integrated scans by said predetermined number, whereby said component signals represent an average over said plurality of scans.

30. An apparatus as described in claim 19 wherein said comparison means classifies said post-print reflectance signal as being satisfactory, unsatisfactory, as less than said predetermined minimum or greater than said predetermined fraction of said background reflectance signal, or doubtful; and further comprises:

a) means for, if said post-print reflectance signal is unsatisfactory, generating an output signal indicative of poor print quality; and b) means for, if said post-print reflectance signal is doubtful, printing a test pattern and waiting for an operator response; and then b1) if said operator response indicates said test pattern is acceptable, accepting said indicia and continuing operation of said printing mechanism; and b2) if said operator response indicates said test pattern is unacceptable, rejecting said indicia and generating said output signal indicative of poor print quality; and b3) if said operator response indicates said test pattern is acceptable, adjusting said comparison to classify a greater portion of post-print reflectance signals as satisfactory; and b4) if said operator response indicates said test pattern is unacceptable, adjusting said comparison to classify a greater portion of post-print reflectance signals as unsatisfactory.

31. An apparatus as described in claim 30 wherein said test pattern includes variable information not known to said operator and said operator response indicates said test pattern is acceptable if it correctly includes said variable information, and said operator response indicates said test pattern is unacceptable if it does not correctly include said variable information.

32. An apparatus as described in claim 30 wherein said comparison is adjusted so as to classify a lesser portion of said post-print reflectance signals as doubtful.

33. An apparatus as described in claim 19 wherein the non-print region of said substrate is proximate to said image and aligned transversely to relative direction of motion of said substrate and said digital printing mechanism.

34. An apparatus for monitoring print quality produced by a digital printing mechanism, said method comprising the steps of:

a) means for providing predetermined print control signals to said digital printing mechanism, said printing mechanism responding to said print control signals to print an image on a substrate;

b) means for providing a reference signal;

c) means for scanning said image to generate a post-print reflectance signal;

d) comparison means for:

d1) comparing said reference signal with said post-print reflectance signal to classify said post-print reflectance signal as being satisfactory, unsatisfactory, or doubtful; then d2) if said post-print reflectance signal is unsatisfactory, generating an output signal indicative of poor print quality; and d3) if said post-print reflectance signal is doubtful, printing a test pattern and waiting for an operator response; and then d3.1) if said operator response indicates said test pattern is acceptable, accepting said indicia and continuing operation of said printing mechanism; and d3.2) if said operator response indicates said test pattern is unacceptable, rejecting said indicia and generating said output signal indicative of poor print quality; and d3.4) if said operator response indicates said test pattern is acceptable, adjusting said comparison to classify a greater portion of post-print reflectance signals as satisfactory; and d3.5) if said operator response indicates said test pattern is unacceptable, adjusting said comparison to classify a greater portion of post-print reflectance signals as unsatisfactory.

35. An apparatus as described in claim 34 wherein said test pattern includes variable information not known to said operator and said operator response indicates said test pattern is acceptable if it correctly includes said variable information, and said operator response indicates said test pattern is unacceptable if it does not correctly include said variable information.

36. An apparatus as described in claim 34 wherein said comparison is adjusted so as to classify a lesser portion of said post-print reflectance signals as doubtful.

* * * * *

UNITED STATES PATENT AND TRADEMARK OFFICE
CERTIFICATE OF CORRECTION

PATENT NO. : 6,612,676 B1
APPLICATION NO. : 09/193608
DATED : September 2, 2003
INVENTOR(S) : Kevin M. Minckler It is certified that error appears in the above-identified patent and that said Letters Patent is hereby corrected as shown below:

On the title page, item (56), under "Foreign Patent Documents", in column 2, line 4,
below "EP 0714777 B1 11/1995 ............B41J/2/165"
insert -- EP 0 872 354 A2 10/1994 ............B41J 19/20 --.

Signed and Sealed this

Seventeenth Day of November, 2009

David J. Kappos
*Director of the United States Patent and Trademark Office*